(12) United States Patent
Minshull et al.

(10) Patent No.: US 11,465,518 B2
(45) Date of Patent: Oct. 11, 2022

(54) CHARGING SCHEME FOR ELECTRIC PROPULSION SYSTEMS

(71) Applicants: Stephen Minshull, Bromsgrove (GB); Kyle Stephen Ives, Loves Park, IL (US)

(72) Inventors: Stephen Minshull, Bromsgrove (GB); Kyle Stephen Ives, Loves Park, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 244 days.

(21) Appl. No.: 16/851,353

(22) Filed: Apr. 17, 2020

(65) Prior Publication Data
US 2021/0323425 A1    Oct. 21, 2021

(51) Int. Cl.
*F02C 9/48* (2006.01)
*B60L 53/24* (2019.01)
(Continued)

(52) U.S. Cl.
CPC .............. *B60L 53/24* (2019.02); *B60L 50/60* (2019.02); *B64D 27/02* (2013.01); *B64D 27/24* (2013.01);
(Continued)

(58) Field of Classification Search
CPC ......... Y02T 90/14; Y02T 50/60; Y02T 10/70; Y02T 10/7072; B60L 50/60; B60L 53/24;
(Continued)

(56) References Cited

U.S. PATENT DOCUMENTS 9,446,842 B2    9/2016    Luyks
10,435,165 B2    10/2019    Swann et al.
(Continued)

FOREIGN PATENT DOCUMENTS

EP    3241753 A1    11/2017
EP    3412566 A1    12/2018
EP    3421371 B1    8/2021

OTHER PUBLICATIONS

European Search Report for Application No. 21168453.5, dated Aug. 31, 2021, 10 pages.

*Primary Examiner* — Jared Fureman
*Assistant Examiner* — Esayas G Yeshaw
(74) *Attorney, Agent, or Firm* — Cantor Colburn LLP (57) ABSTRACT

An engine system for an aircraft comprising a propulsor configured to drive the aircraft, a thermal combustion engine configured to drive the propulsor, an electric motor connected to the thermal combustion engine and configured to drive the propulsor, a power converter configured to apply a torque to the electric motor and generate electric energy from the torque applied to the electric motor, and an engine controller, the engine controller being configured to determine a current power output of the thermal combustion engine, determine an optimum power output of the thermal combustion engine based on current operating conditions, and vary the torque applied to the electric motor so as to vary a load on the thermal combustion engine, wherein the torque may be varied by an amount required to vary the power output of the thermal combustion engine to the determined optimum power output.

16 Claims, 4 Drawing Sheets

(51) Int. Cl.
  *B60L 50/60*   (2019.01)
  *B64D 27/02*   (2006.01)
  *B64D 27/24*   (2006.01)
  *B64D 31/02*   (2006.01)
  *B64D 31/14*   (2006.01)

(52) U.S. Cl.
  CPC ............. *B64D 31/02* (2013.01); *B64D 31/14* (2013.01); *B60L 2200/10* (2013.01); *B64D 2027/026* (2013.01)

(58) Field of Classification Search
  CPC ..... B60L 2200/10; B64D 27/24; B64D 31/06; B64D 31/14; B64D 2027/026; B64D 31/02; B64D 27/02
  See application file for complete search history.

(56) References Cited

U.S. PATENT DOCUMENTS

| | | |
|---|---|---|
| 2008/0184906 A1 | 8/2008 | Kejha |
| 2009/0111640 A1 | 4/2009 | Buur et al. |
| 2015/0151844 A1 | 6/2015 | Anton et al. |
| 2016/0257416 A1 | 9/2016 | Himmelmann et al. |
| 2017/0008627 A1 | 1/2017 | De Soto et al. |
| 2017/0327224 A1 | 11/2017 | Phan et al. |
| 2018/0003109 A1 | 1/2018 | Lents et al. |
| 2019/0002115 A1 | 1/2019 | Miller et al. |
| 2019/0285005 A1* | 9/2019 | Nakamura ............. F02D 41/04 |
| 2019/0322382 A1 | 10/2019 | MacKin |
| 2019/0382123 A1 | 12/2019 | Schwarz et al. |
| 2020/0132003 A1* | 4/2020 | Höglund .......... F02M 35/10222 |
| 2020/0182175 A1* | 6/2020 | Hitomi ................ F02D 41/1454 |
| 2020/0271061 A1* | 8/2020 | Kopeschka ............... F02C 9/28 |
| 2020/0362810 A1* | 11/2020 | Ohura .................... F02D 41/38 |

\* cited by examiner

CHARGING SCHEME FOR ELECTRIC PROPULSION SYSTEMS

FIELD

The present disclosure relates generally to hybrid aircraft propulsion systems and more specifically to charging schemes for energy storage systems of hybrid aircraft.

BACKGROUND

Conventional thermal combustion engine driven aircraft are designed such that peak efficiency occurs during phases of peak fuel consumption such as, for example, during takeoff or climb. Accordingly, such systems are designed with engines which are oversized for less strenuous phases of flight such as cruise and descent and, thus, operate at below peak fuel efficiency for the majority of the duration of flight.

Hybrid propulsion systems for aircraft seek to improve fuel efficiency by taking into account the different operational power requirements during different phases of flight. In hybrid propulsion systems an electrical motor and thermal combustion engine are provided in series or parallel to meet the varied thrust requirements of the aircraft during different phases of flight.

In this context, an established approach is to use a so-called pulsed hybrid architecture wherein thermal combustion engines are used during takeoff and switched off during cruise in favour of an electric motor thereby avoiding operating in modes of low fuel efficiency. For example, US 2016/0257416 A1 discloses pulsed power propulsion systems for aircraft wherein an electrical propulsor is powered by either a turbine engine or an energy storage system. During phases of flight in which the turbine engine would typically operate at less efficient throttle settings, the system shuts down the turbine and instead drives the propulsor with energy from the energy storage system so that the aircraft can be propelled without the need for the turbine to be running. The turbine may be restarted as needed, or pulsed, to recharge the energy storage system.

Similarly, US 2019/0322382 A1 discloses a hybrid propulsion system wherein a gas turbine engine drives a propulsor via a clutch coupling in a first mode of operation, and the gas turbine engine is decoupled and an electric motor drives the propulsor in a second mode of operation. During the first mode of operation, the electric motor may be used as a generator to charge the battery.

However, such pulsed hybrid propulsion systems still require engines which are oversized for the longest phases of flight such as cruise. Though fuel efficiency is improved by only operating the engine as needed, the increased weight and drag associated with such oversized systems still result in an overall increase in fuel consumption relative to systems which are not oversized for cruise phases of flight.

In this regard parallel hybrid propulsion architectures which can cooperatively generate thrust from both thermal combustion engines and electric motors are of keen interest. In such systems thermal combustion engines can be designed, or sized, for less strenuous phases of flight such as cruise and descent. Thus, the resulting engines are not oversized for the majority of phases of flight and do not contribute to an excess in weight and drag associated with oversized engines.

In these parallel hybrid architectures the main propulsor is driven by two means; a traditional thermal combustion engine and an electric motor. The mechanical outputs of the thermal combustion engine and electric motor are combined to drive the propulsor. Typically, the thermal engine is controlled with commands from the pilot. The division of power flow from the thermal engine and electric motor can be selected through the system design and can be adjusted during operation. Typically for this type of system, the electric section is sized with sufficient energy storage to provide a power boost to the thermal engine during take-off and climb flight phases with the thermal engine then providing the full power output during cruise.

This provides a fuel saving since the thermal engine can be optimised for optimal efficiency during the cruise phase and does not need to be oversized for the full take off power.

In the state of the art parallel hybrid architecture for electric aircraft propulsion, the battery is recharged through a ground based charger after the aircraft has landed. This is similar to how a traditional non-hybrid aircraft is refuelled with jet fuel. However, the charging time for the hybrid architecture is much longer and may take several hours to fully recharge the batteries.

Moreover, parallel hybrid propulsion architectures are most applicable for relatively short flights in the region of 100-200 nautical miles. To be profitable, airlines schedule short turnaround times which do not allow sufficient charging time needed to fully recharge the batteries in the hybrid system.

In addition, current technology battery systems do not have enough energy density to allow for a large amount of electrical reserve energy for use in aircraft emergency situations. In the case of an engine out or other aircraft emergencies where additional engine power is needed for extended amounts of time, the battery may become depleted and leave only thermal power available.

Recharging the batteries whilst in-flight has been contemplated. For example, US 2008/0184906 A1 discloses a long range hybrid electric airplane wherein both a combustion engine and an electric motor drive a propeller during takeoff. During cruising only a combustion engine is used and said engine operates so as to continuously generate an excess of power. This excess power is used to generate electricity for in-flight operations and to recharge batteries.

US 2018/0003109 A1 discloses a parallel hybrid gas turbine propulsion system wherein an electric motor is connected to a shaft of the engine and configured to cause the motor to provide boost power to the gas turbine engine during takeoff Once in a cruise mode of operation the motor is not required to provide supplemental rotation of the gas turbine engine. However, due to the physical connection rotation provided to the motor, the motor can be switched to a regenerate mode to provide electric power back to the power distribution system to power on-board electric systems and charge an energy storage component.

Despite the above, there remains a need for a system which can dynamically balance the requirement of increased fuel efficiency and in-flight recharging of an energy storage system.

SUMMARY

In accordance with an aspect of the disclosure, there is provided an engine system for an aircraft comprising a propulsor configured to drive the aircraft, a thermal combustion engine configured to drive the propulsor, an electric motor connected to the thermal combustion engine and configured to drive the propulsor, a power converter configured to apply a torque to the electric motor and generate electric energy from the torque applied to the electric motor, and an engine controller, the engine controller being configured to determine a current power output of the thermal combustion engine, determine an optimum power output of the thermal combustion engine based on current operating conditions, and vary the torque applied to the electric motor so as to vary a load on the thermal combustion engine, wherein the torque may be varied by an amount required to vary the power output of the thermal combustion engine to the determined optimum power output.

This engine system allows for additional in-flight electric power generation using the excess capacity of the thermal combustion engine whilst improving overall engine efficiency. More specifically, this system can increase fuel consumption within a specific operational range wherein engine efficiency increases in tandem with fuel consumption. Thus, this system allows for highly cost effective power generation which can be used to recharge the associated energy storage system (e.g., batteries), thereby reducing costs associated with extended turnaround times as batteries are charged on land. Further, the additional power stored in the recharged energy storage system can be utilised in lieu of an auxiliary power unit (APU), or to provide additional thrust in cases of emergency.

The engine controller may be configured to compare the current power output with the most fuel efficient power output.

The engine controller may be configured to increase the torque applied to the electric motor by the power converter if the current power output is below the optimum power output, so as to increase the load on the thermal combustion engine.

The engine controller may be configured to decrease the torque applied to the electric motor by the power converter if the current power output is above the optimum power output, so as to decrease the load on the thermal combustion engine.

The engine controller may be configured to increase or decrease the torque by an amount required to increase or decrease the power output of the thermal combustion engine to the optimum power output.

The current power output may be determined from a measured fuel consumption rate of the thermal combustion engine.

The optimum power output may be the most fuel efficient power output of the thermal combustion engine.

The most fuel efficient power output may correspond to a power output determined to be the most fuel efficient for the current operating conditions of the engine system.

The engine controller may further comprise a database and the optimum power output may be determined from a schedule of optimum power outputs stored on the database.

The optimum power output may be a fixed and/or predetermined value based on one or more operating conditions.

The power converter may comprise a variable torque actuator.

The system may further comprise an energy storage device, and the electric energy generated from the torque applied to the electric motor may be used to charge the energy storage device.

In accordance with an aspect of the disclosure, there is provided a method of operating an engine system (e.g. the engine system of any embodiment of the disclosure). The method comprises determining a current power output of a thermal combustion engine, determining an optimum power output of the thermal combustion engine based on current operating conditions, and varying the torque applied to an electric motor so as to vary a load on the thermal combustion engine, wherein the torque may be varied by an amount required to vary the power output of the thermal combustion engine to the determined optimum power output.

The method may further comprise comparing the current power output with the most fuel efficient power output, and increasing the torque applied to the electric motor by the power converter if the current power output is below the optimum power output, so as to increase the load on the thermal combustion engine, and by an amount required to increase the power output of the thermal combustion engine to the optimum power output.

The method may further comprise comparing the current power output with the most fuel efficient power output, and decreasing the torque applied to the electric motor by the power converter if the current power output is above the optimum power output, so as to decrease the load on the thermal combustion engine, and by an amount required to decrease the power output of the thermal combustion engine to the optimum power output.

In accordance with an aspect of the disclosure, there is provided an aircraft propulsion system comprising an engine system in accordance with any embodiment of the present disclosure.

In accordance with an aspect of the disclosure, there is provided an aircraft propulsion system comprising an engine controller configured to carry out a method in accordance with any embodiment of the present disclosure.

BRIEF DESCRIPTION OF THE DRAWINGS

Various embodiments will now be described, by way of example only, and with reference to the accompanying drawings in which.

DETAILED DESCRIPTION

Herewith will be described various embodiments of a system and method for use in an aircraft and other aerospace applications.

Figure 1:
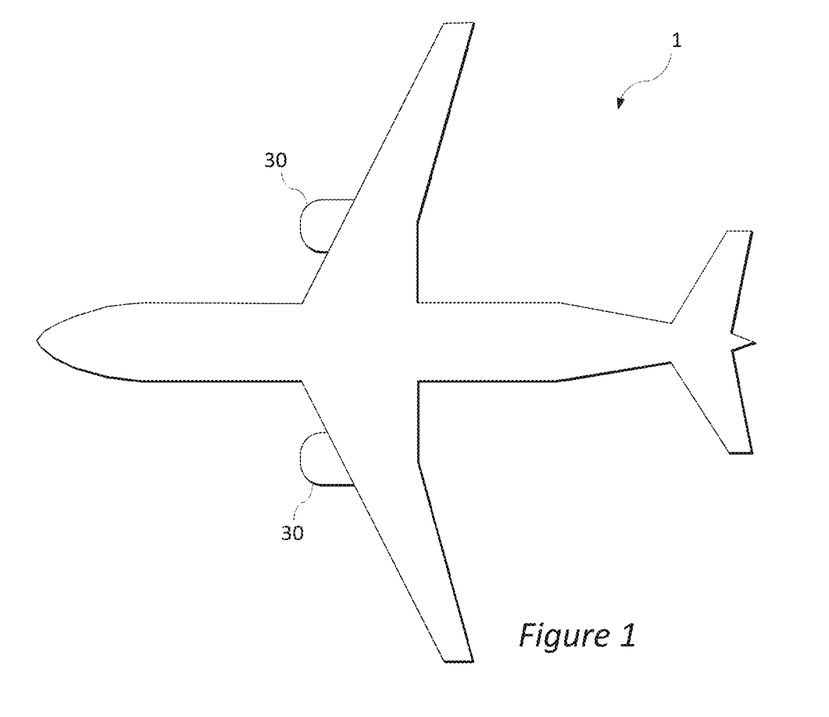
FIG. 1 shows an embodiment of an aircraft comprising a propulsion system including one or more engine systems in accordance with the present disclosure.

FIG. 1 shows an aircraft 1 comprising a propulsion system including one or more engine systems 30.

Figure 2:
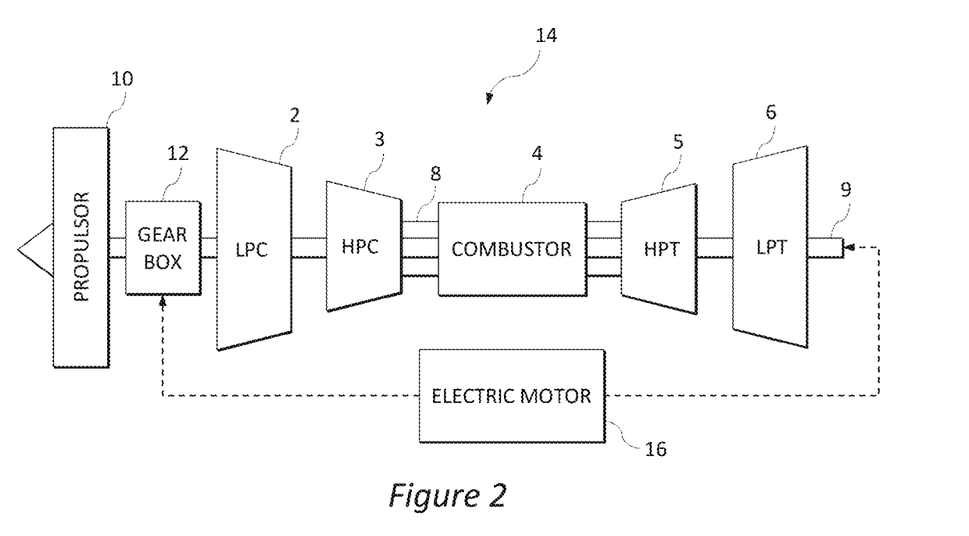
FIG. 2 shows a representative engine system in accordance with embodiments of the present disclosure.

FIG. 2 shows one of the engine systems 30 of FIG. 1, which is configured with a parallel hybrid architecture in accordance with various embodiments of the disclosure. That is, the engine systems 30 each comprise a thermal combustion engine 14 including a combustor chamber 4 and may include one or more compressor sections (e.g., a low pressure compressor section 2, a high pressure compressor section 3), and one or more turbine sections (e.g., a high pressure turbine section 5 and a low pressure turbine section 6). The thermal combustion engine 14 may comprise a rotating shaft or a first shaft 9 (e.g., a low pressure shaft) which may connect a low pressure compressor section 2 and a low pressure turbine section 6. The thermal combustion engine 14 may comprise a second shaft 8 (e.g. a high pressure shaft) which may connect a high pressure compressor section 3 and a high pressure turbine section 5. A shaft of the engine (e.g., the first shaft 9) may be connected to a propulsor 10 via a connection means 12 (e.g., a gearbox). An electric motor 16 may be connected to the thermal combustion engine 14 via the connection means 12. Alternatively, the electric motor 16 may be connected to a shaft of the engine (e.g., the first shaft 9).

To achieve optimal fuel savings with a parallel hybrid architecture such as the one described herein, the thermal engine 14 may be sized for optimal fuel efficiency during cruise with the necessary extra power during take-off and climb provided by the electric motor 16.

Figure 3:
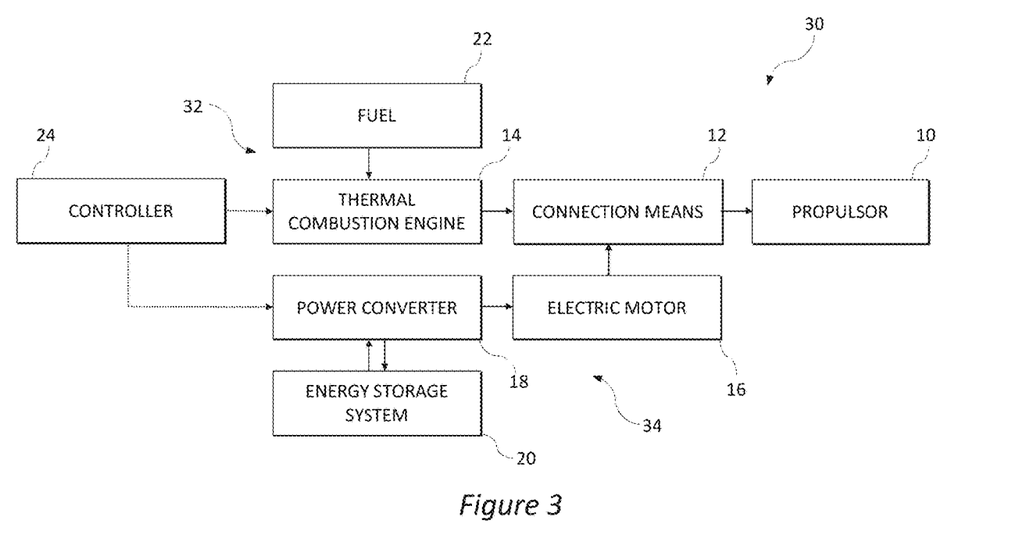
FIG. 3 shows a schematic of an embodiment of an engine system (e.g. the engine system of FIG. 2) in accordance with the present disclosure.

FIG. 3 shows a schematic of a system 30 in accordance with the disclosure, which may be referred to as a parallel hybrid propulsion system, and may correspond to one or both of the engine systems 30 described above with reference to FIGS. 1 and 2.

The system 30 comprises a thermal energy section 32 and an electric section 34 wherein the thermal energy section 32 comprises a thermal combustion engine 14 and a fuel source 22, and the electric section 34 comprises an electric motor 16 and a power source 18, 20. A propulsor 10 is driven by two means, namely the thermal combustion engine 14 and the electric motor 16.

The propulsor 10 may comprise a propeller, an unducted fan or a ducted fan. The propulsor 10 may comprise blades or aerofoils which may be fixed. The propulsor 10 may comprise blades or aerofoils which are variable, for example, blades which are rotatable about an axis.

Though a gas turbine engine is depicted in FIG. 2, this figure is provided for reference only. The thermal combustion engine 14 of the thermal energy section 32 of system 30 may comprise a rotary engine, a reciprocating engine, a turbomachine (for example, a turboprop, a turbofan, a turboshaft or a turbojet engine) or any other aircraft engine as is known in the art.

The mechanical outputs of the thermal combustion engine 14 and electric motor 16 may be combined through a connection means 12 to drive the propulsor 10. The connection means 12 may comprise a gear box and/or a suitable transmission (e.g. a freewheel or overrunning clutch) configured transmit drive from the thermal energy section 32 and the electric section 34 to the propulsor 10.

The thermal combustion engine 14 may be controlled with a controller 24 (e.g., an engine controller), which may receive commands from an operator (e.g., a pilot), current operational conditions and/or inputs from a control system of the aircraft wherein the operating conditions includes operation state of aircraft, e.g., as set by pilot (take-off, climb, cruise etc.), operational parameters of engine (pressure, temperature, measured specific fuel consumption etc.), sensor data from aircraft (altitude, yaw/pitch/roll, outside air temperature etc.). The controller acts to produce the necessary actuation signals to drive the thermal combustion engine 14 (e.g., the controller may control a supply of fuel from fuel source 22 to the thermal combustion engine 14).

The electric motor 16 may be controlled with the power source. The power source may comprise a power converter 18 which converts electrical power from an energy storage system 20 (e.g., a battery) into a form that can drive the electric motor 16. This conversion may be from DC (e.g., from a battery) to multi-phase AC (to drive the electric motor). The output from the power converter 18 may be controlled by the controller 24 such that the electrical motor 16 drives the mechanical output as required by the system 30.

Figure 4:
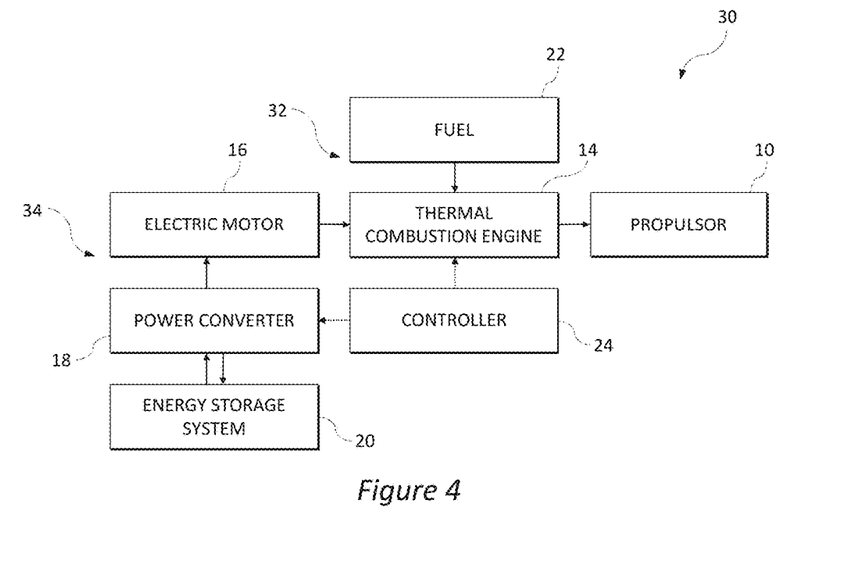
FIG. 4 shows a schematic of another embodiment of an engine system (e.g. the engine system of FIG. 2) in accordance with the present disclosure.

Alternatively, as depicted in FIG. 4 (where like elements are referred to with like reference numerals), the connection means 12 may be omitted and the electric motor 16 may connect to a shaft of the thermal combustion engine 14 (e.g., in the case of a gas turbine engine, the first or second shaft 9, 8 of the thermal combustion engine 14 depicted in FIG. 2). The controller 24 and power converter 18 acts to control the system 30 as described above.

Referring to FIGS. 3 and 4, the division of power flow between the thermal section 32 and electric section 34 can be selected through the system 30 design and can be adjusted during operation using the controller 24. The electric section 34 is sized with sufficient energy storage to be configured in a first mode of operation to provide a power boost to the thermal combustion engine 14 during take-off and climb flight phases. The thermal combustion engine 14 can then provide the full power output during cruise if desired.

Figure 5:
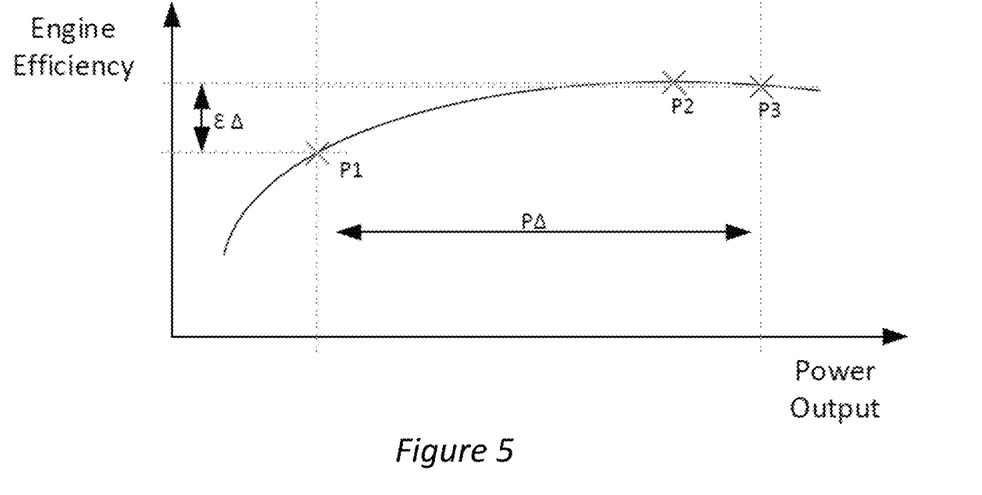
FIG. 5 shows a graphical illustration of typical fuel efficiency characteristics over a varying output power range of a thermal combustion engine in accordance with any of the embodiments of the present disclosure.

FIG. 5 shows typical fuel efficiency characteristics over a varying output power range of a thermal combustion engine in accordance with the disclosure. A peak in fuel efficiency is achieved at a relatively high power output P2. Above and below this power output the fuel efficiency of the thermal combustion engine 14 is reduced. Thus this power output is considered the optimum (i.e. most fuel efficient) power output P2 of the thermal combustion engine 14. During the takeoff phase the thermal combustion engine 14 operates to maximise power output, and typically operates at or above the optimum power output P2 (e.g., in the region of P2 or above). Additional power output or drive can be provided by the electric motor 16 as required by the system 30.

During the cruise phase, the required power output may vary due to changing flight conditions. The required power output may vary over a range PA between a maximum power output required during cruise P3, and a minimum power output required during cruise P1. The optimum or most fuel efficient power output P2 resides in this range. As the power or thrust requirement from the system fluctuates (e.g., due to changing flight conditions), the required power output of the system may drop below the optimum power output P2.

Consequently, when the required power output from the thermal combustion engine 14 is less than the optimum power output P2 (in the range P1 to P2) then there is an additional highly fuel efficient power capacity available within the system 30. Additional fuel use in this region will increase the overall fuel efficiency of the thermal combustion engine 14 towards peak fuel efficiency. Thus, by increasing the load on the thermal combustion engine 14, additional power can be generated in a highly fuel efficient manner.

In accordance with the disclosure a method for efficiently generating power from a parallel hybrid propulsion system 30 as described above is now disclosed.

When the required thrust from the system 30 is reduced such that thrust is no longer required from the electric motor 16 (i.e. the thermal combustion engine 14 alone can provide sufficient thrust), the electric section 34 may be switched to a second regenerative mode of operation. Switching to the regenerative mode may occur automatically as a consequence of a reduced thrust requirement or due to other inputs to the system 30 (e.g., pilot input).

In the second mode of operation the controller 24 and the power converter 18 may be configured to convert the electric motor 16 into a generator. Thus the electric motor 16 may also be referred to as the generator 16. In order to generate power, torque may be applied to a shaft of the electric motor 16. Torque may be applied with a generator current controller such as a torque actuator which may be a variable torque actuator. In the absence of any applied torque the electric motor 16 may be free spinning.

Figure 6:
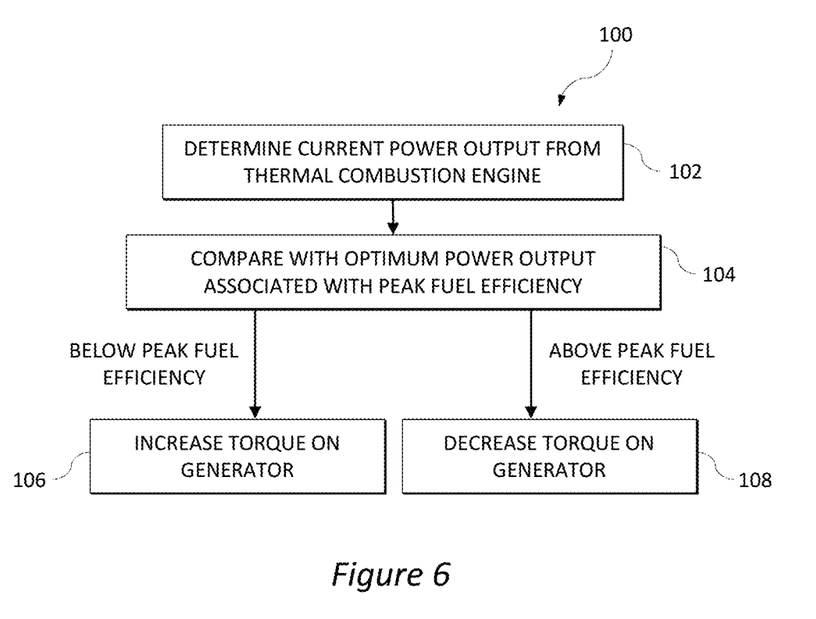
FIG. 6 shows a schematic for a method for generating power from an engine system (e.g. the engine system of any of the embodiments disclosed herein) in accordance with the present disclosure.

FIG. 6 shows a schematic for a method 100 for generating power (e.g., using system 30) comprising steps as outlined below.

At step 102 a current power output from the thermal combustion engine 'P' is determined. The current power output P of the thermal combustion engine 14 may be determined in any manner as is known in the art. For example, power output may be determined from specific fuel consumption as is measured by a fuel pump or flow meter or the like. Power output may be determined with sensor data from the thermal combustion engine 14 (e.g., engine torque and speed measurements from suitable sensors), the connection means 12 and/or the propulsor 10. Power output from the thermal combustion engine 14 may be determined with data collected from or associated with the electric motor 16 (e.g., rotational speed from suitable sensors).

At step 104, the measured or determined power output P is then compared with the optimum power output P2. The optimum power output P2 may vary dynamically with operating conditions, and thus may not be constant. A schedule for the optimum power output P2 may be determined by design and testing of the thermal combustion engine 14 or could be measured dynamically through measured fuel usage at or from the fuel source 22. The optimum power output P2 may be determined or scheduled in relation to different operating conditions, wherein the operating conditions includes operation state of aircraft, e.g., as set by pilot (take-off, climb, cruise etc.), operational parameters of engine (pressure, temperature, measured specific fuel consumption etc.), sensor data from aircraft (altitude, yaw/pitch/roll, outside air temperature etc.).

If the current power output P is found to be below the optimum power output P2, then the system may be configured to increase the torque on the electric motor/generator 16 (step 106), in order to increase the load on the thermal combustion engine 14, thereby increasing fuel consumption to a more efficient or optimum level. The additional power generated may be used to charge the energy storage system 20.

Conversely, if the current power output P is found to be above the optimum power output P2, then the system may decrease the torque on the electric motor/generator 16 (step 108), in order to decrease the load on the thermal combustion engine 14, thereby decreasing the fuel consumption to a more efficient or optimum level.

Increasing the power output to charge the energy storage system 20 in this way allows the thermal combustion engine 14 to operate at a higher or peak fuel efficiency. This means that the energy storage system 20 can be charged in-flight, reducing (or even eliminating) the time taken to recharge on the ground. This may also provide additional reserve power for use in emergency conditions.

Referring again to FIGS. 3 and 4, the controller 24 may be configured to carry out any or all of the above method steps. A communications data link may be used to provide coordination between the controller 24 and the electric motor/generator 16. For example, the controller 24 may be configured to identify operating conditions where additional capacity within the PA range is available, and then output a signal to the power converter 18 to start to extract additional power by applying torque with the power converter 18. This power may then be delivered to the energy storage system 20.

Figure 7:
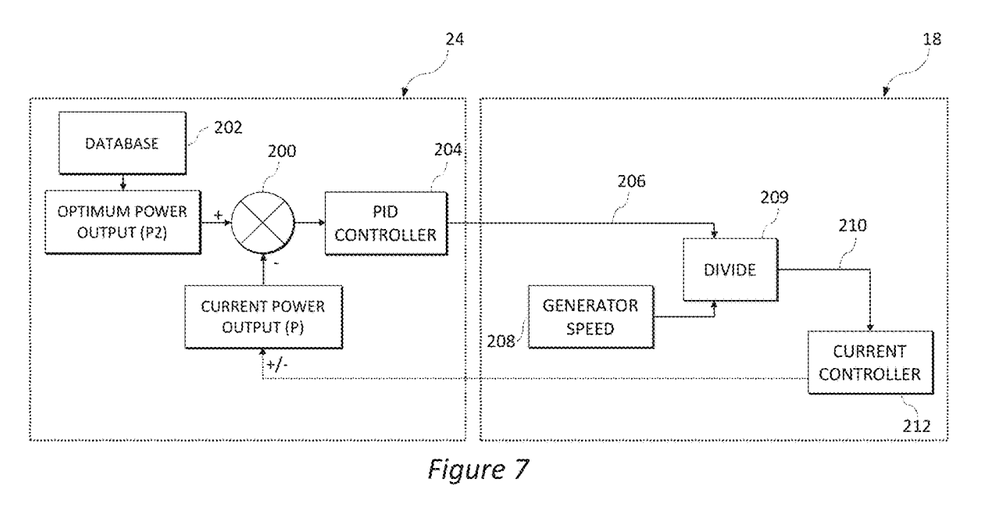
FIG. 7 shows a schematic of a control system suitable for the engine system of any of the embodiments of the present disclosure.

The above described method may be performed with a control system as shown schematically in FIG. 7, which may be referred to as a closed loop control system. The controller 24 may comprise a summation unit 200 and a proportional integral differential (PID) controller 204. The summation unit 200 may generate an error signal by comparing the current power output P with the optimum power output P2 of the thermal combustion engine 14. As described above, the optimum power output may vary dynamically. Thus, the controller may further comprise a database 202 containing a schedule of optimum power outputs for various operating conditions. Alternatively, the controller may calculate the optimum power output P2 dynamically through measured fuel usage at or from the fuel source 22, or the optimum power output P2 may be a fixed value corresponding to a set rate of fuel consumption.

The error signal from the summation unit 200 may be calculated by subtracting the measured thermal combustion engine power output P from the optimal power output P2. The error signal is passed through the PID controller 204, which is configured to generate a generator power demand signal 206, which is passed over the data link to the power converter 18. The generator power demand signal 206 corresponds to the additional power which can be generated in order to reach peak fuel efficiency. The power converter may comprise means 208 for determining a generator speed and the power converter 18 may comprise a controller 212 which is configured to control a current generated by the generator 16 (e.g., a torque actuator).

The power converter 18 may comprise means (e.g., circuitry) 209 configured to divide the generator power demand signal 206 by the generator speed 208 to generate a torque command 210. Alternatively, such calculations may be conducted by the controller 24 alone. The torque command 210 may correspond to the actual torque applied on the generator 16, or it may correspond to a differential in the amount of torque applied (i.e. the change in torque). The torque command 210 may then be applied as an input into the current controller 212 which increases the torque on the generator 16, thereby increasing the load on the thermal combustion engine 14. This increases the current power output P and fuel consumption to a more efficient state.

Conversely, if the current power output P is greater than the optimum power output P2, then the generator power demand 206 may be negative. This would cause the torque command 210 to be negative and would result in a reduction of applied torque, or complete disengagement of the current controller 212 from the generator 16, thereby reducing the load on the thermal combustion engine 14.

Although the present disclosure has been described with reference to various embodiments, it will be understood by those skilled in the art that various changes in form and detail may be made without departing from the scope of the invention as set forth in the accompanying claims.

The invention claimed is:
1. An engine system for an aircraft comprising:
a propulsor configured to drive the aircraft;

a thermal combustion engine configured to drive the propulsor;

an electric motor-generator connected to the thermal combustion engine and configured to drive the propulsor;

a power converter configured to apply a torque to the electric motor-generator and generate electric energy from the torque applied to the electric motor; and an engine controller configured to:
- determine a current power output of the thermal combustion engine;
- determine a most fuel efficient an optimum power output of the thermal combustion engine based on current operating conditions;
- compare the current power output (P) with the most fuel efficient power output (P2); and
- increase or decrease the torque applied to the electric motor so as to increase or decrease a load on the thermal combustion engine, wherein the torque is varied increased or decreased by an amount required to increase or decrease the power output of the thermal combustion engine to the determined most fuel efficient power output.

2. The engine system of claim 1, wherein the engine controller is configured to increase the torque applied to the electric motor-generator by the power converter if the current power output is below the most fuel efficient power output, so as to increase the load on the thermal combustion engine.

3. The engine system of claim 2, wherein the engine controller is configured to decrease the torque applied to the electric motor-generator by the power converter if the current power output is above the most fuel efficient power output, so as to decrease the load on the thermal combustion engine.

4. The engine system of claim 3, wherein the engine controller is configured to increase or decrease the torque by an amount required to increase or decrease the power output of the thermal combustion engine to the optimum power output.

5. The engine system of claim 1, wherein the engine controller is configured to decrease the torque applied to the electric motor-generator by the power converter if the current power output is above the most fuel efficient power output, so as to decrease the load on the thermal combustion engine.

6. The engine system of claim 1, wherein the most fuel efficient power output corresponds to a power output determined to be the most fuel efficient for the current operating conditions of the engine system.

7. The engine system of claim 6, wherein the engine controller further comprises a database and the most fuel efficient power output is determined from a schedule of most fuel efficient power outputs stored on the database.

8. The engine system of claim 6, wherein the most fuel efficient power output is a fixed and/or predetermined value based on one or more operating conditions.

9. The engine system of claim 1, wherein the power converter comprises a variable torque actuator.

10. The engine system of claim 1, further comprising an energy storage device, wherein the electric energy generated from the torque applied to the electric motor-generator is used to charge the energy storage device.

11. A method for operating an engine system for an aircraft as recited in claim 1, the method comprising:

determining a current power output of the thermal combustion engine;

determining a most fuel efficient power output of the thermal combustion engine based on current operating conditions;

comparing the current power output (P) with the most fuel efficient power output (P2); and increasing or decreasing the torque applied to the electric motor-generator so as to increase or decrease a load on the thermal combustion engine, wherein the torque is increased or decreased by an amount required to increase or decrease the power output of the thermal combustion engine to the determined most fuel efficient power output and varying the torque applied to the electric motor so as to vary a load on the thermal combustion engine, wherein the torque is varied by an amount required to vary the power output of the thermal combustion engine to the determined optimum power output.

12. The method as claimed in claim 11, further comprising:

increasing the torque applied to the electric motor-generator by the power converter if the current power output is below the most fuel efficient power output, so as to increase the load on the thermal combustion engine, and by an amount required to increase the power output of the thermal combustion engine to the most fuel efficient power output.

13. The method as claimed in claim 11, decreasing the torque applied to the electric motor-generator by the power converter if the current power output is above the most fuel efficient power output, so as to decrease the load on the thermal combustion engine, and by an amount required to decrease the power output of the thermal combustion engine to the most fuel efficient power output.

14. An aircraft propulsion system having an engine system comprising:

an engine system as recited in claim 1; and an engine controller configured to:
- determine a current power output of the thermal combustion engine;
- determine a most fuel defficient power output of the thermal combustion engine based on current operating conditions;
- compare the current power output (P) with the most fuel efficient power output (P2); and
- increase or decrease the torque applied to the electric motor so as to increase or decrease a load on the thermal combustion engine, wherein the torque is increased or decreased by an amount required to increase or decrease the power output of the thermal combustion engine to the determined most fuel efficient power output.

15. The engine system of claim 1, wherein the current power output (P) is determined with sensor data from the thermal combustion engine, a connection means connected between the electric motor-generator connected to the thermal combustion engine or the propulsor.

16. The engine system of claim 1, wherein the current power output (P) is determined with data collected from or associated with the electric motor-generator.

* * * * *